(12) United States Patent
Jaffee

(10) Patent No.: US 8,681,437 B2
(45) Date of Patent: Mar. 25, 2014

(54) MAGNIFICATION SYSTEMS

(76) Inventor: Thomas A Jaffee, Boca Raton, FL (US)

(*) Notice: Subject to any disclaimer, the term of this patent is extended or adjusted under 35 U.S.C. 154(b) by 0 days.

(21) Appl. No.: 13/539,326

(22) Filed: Jun. 30, 2012

(65) Prior Publication Data

US 2013/0271857 A1 Oct. 17, 2013

Related U.S. Application Data

(60) Provisional application No. 61/624,860, filed on Apr. 16, 2012.

(51) Int. Cl.
*G02B 7/02* (2006.01)
(52) U.S. Cl.
USPC .............................. 359/818; 359/809; 359/802
(58) Field of Classification Search
USPC .................................................. 359/801–830
See application file for complete search history.

(56) References Cited

U.S. PATENT DOCUMENTS

| | | | |
|---|---|---|---|
| 6,389,268 B1 | 5/2002 | Snyder | |
| 7,274,521 B2 | 9/2007 | Compton | |
| 7,277,239 B2 | 10/2007 | Carnevali | |
| 7,567,394 B1 | 7/2009 | Monte | |
| 7,792,550 B2 | 9/2010 | Lishan | |
| 2005/0141185 A1 | 6/2005 | O'Neal et al. | |
| 2006/0171044 A1* | 8/2006 | Carnevali | 359/802 |
| 2008/0024884 A1 | 1/2008 | Rowe et al. | |
| 2008/0055745 A1* | 3/2008 | Huang | 359/811 |
| 2009/0237813 A1 | 9/2009 | Erlich | |
| 2011/0069404 A1* | 3/2011 | Lappin | 359/818 |

* cited by examiner

*Primary Examiner* — Mohammed Hasan

(57) ABSTRACT

A magnification system for magnifying a surface of a device is provided. The magnification system includes a magnifying lens having a ridge portion extending along one of the edges and securing means for securing the magnifying lens on or above the surface of the device. An example of such a device is a mobile phone. The securing means further includes a base adapted to mount to a surface of the device, an arm pivotally connected to the base with a first connector, a clamp including a channel therein for receiving and slidably holding the ridge portion of the magnifying lens and a second connector for pivotally connecting the arm to the clamp. The second connector further includes a slider member having a, groove and means for attaching the lens to the slider member. The slider member further includes a first pivotally connected part and a second pivotally connected part. The slider member moves along the, groove and further is being attached to the first pivotally connected part. The second pivotally connected part is adapted to slide along a length of the arm and thereby allowing for adjustments to vertical position of the magnifying lens in relation to the surface being magnified.

4 Claims, 19 Drawing Sheets

314

MAGNIFICATION SYSTEMS

RELATED APPLICATIONS

This application claims priority to U.S. Provisional Application No. 61/624,860, filed Apr. 16, 2012, which is incorporated herein by reference in its entirety.

TECHNICAL FIELD

The invention relates to magnification systems. More specifically, the invention relates to magnification systems for magnifying a surface of a device.

BACKGROUND

Often people have a hard time reading a text printed on pages of a book, or a text displayed on displays of their devices such as mobile devices, laptops, computers, and the like. There is a need to provide a magnification system which mounts to a device, does not interfere with its normal operations, is not bulky, can be quickly enabled when magnification is needed and quickly stowed when not needed, allows for touch-screen functionality of an electronic device whether enabled or stowed, and provides surface protection when stowed.

SUMMARY

It is therefore an object of the subject invention to provide a magnification system for magnifying a surface of a device, which can be easily mounted to the device and which does not interfere with its normal operations.

It is further object of the present invention to provide a magnification system which is compact in comparison with the prior art devices, can be quickly enabled when magnification is needed and quickly stowed when not needed.

It is yet further object of the present invention to provide a magnification system that allows for touch-screen functionality of a device whether enabled or stowed, that provides surface protection when stowed, and that is easy for a user to install and is simple to operate.

The present invention features a magnification system for magnifying a surface of a device; the system comprises a magnifying lens and securing means for securing the magnifying lens on or above the surface of the device.

In some embodiments of the present invention, the securing means comprises at least one clip, the at least one clip being adapted to attach to a surface of the device or to a surface of a case for the device.

In one instance, the securing means further comprises an insert positioned under the at least one clip.

In some embodiments, the securing means comprises a sleeve adapted to attach to a surface of the device or to a surface of a case for the device.

In some instances, the magnifying lens can be a Fresnel lens.

According to some preferred embodiments of the present invention, magnifying lens further comprises a ridge portion extending along one of the edges of said magnifying lens; and wherein said securing means comprises a base adapted to mount to a surface of the device, an arm pivotally connected to said base with a first connector, a clamp comprising a channel therein for receiving and slidably holding said ridge portion of said magnifying lens, and a second connector for pivotally connecting said arm to said clamp.

In some variants, the mentioned-above clamp is configured to prevent the lens from sliding freely along an axis parallel to a surface being magnified and to enable the lens to slide along that axis only when some force is applied.

In other variants, the ridge portion of the magnifying lens further comprises a stopper at each distal end of the ridge portion to prevent the lens from completely sliding off of the channel when sliding along the axis parallel to the surface being magnified.

In some instances, the first connector and the second connector are friction hinge connectors; and the arm further comprises an opening at each distal end for attaching it to the first connector and the second connector, respectively.

In some instances at least one of the first and the second connector is a spring hinge connector.

In other instances, the securing means further comprises a bracket to secure a distal end of the arm when the arm is completely stowed.

In some embodiments, the base further comprising a snap fit member for securing said lens when said arm is completely stowed.

In some embodiments, the securing means comprises a base housing, an arm that is pivotally connected to the base housing with a first connector enabling the arm to slide out and then back into the base housing, and a second connector that connects the arm to the magnifying lens.

In some examples, the arm has a bend portion so its natural resting state is the up position, and the base housing has at least one slot in its top portion adapted to receive the bend portion of the arm.

In other examples, a substantial portion of the base housing has a U-shaped profile.

In some embodiments, the second connector comprising a slider member having a groove and means for attaching said lens to said slider member, and a first and a second pivotally connected part; wherein said slider member is being attached to said first pivotally connected part thereby allowing said first pivotally connected part to move along said groove of said slider element; and wherein said second pivotally connected part is adapted to slide along a length of said arm thereby allowing for adjustments to a vertical position of said lens in relation to the surface being magnified.

In some instances, a top portion of the base housing is configured to provide for the curvature of the arm when the arm is completely stowed in the base housing.

In other instances, the top portion of the base housing further comprising a curved portion configured to provide for the curvature of the arm when the arm is completely stowed in the base housing.

And yet in other instances, the top portion of the housing further comprising an opening to provide for the curvature of the arm when the arm is completely stowed in the base housing.

In some embodiments, the arm further comprising a stopper element positioned at the arm's distal end to prevent the second pivotally connected part from sliding out completely when moving along the length of the arm.

DESCRIPTION OF DRAWINGS

The preceding summary, as well as the following description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

FIG. 18 is a perspective view of a second pivotally connected part shown in

FIG. 16.

DETAILED DESCRIPTION OF THE INVENTION

Figure 1:
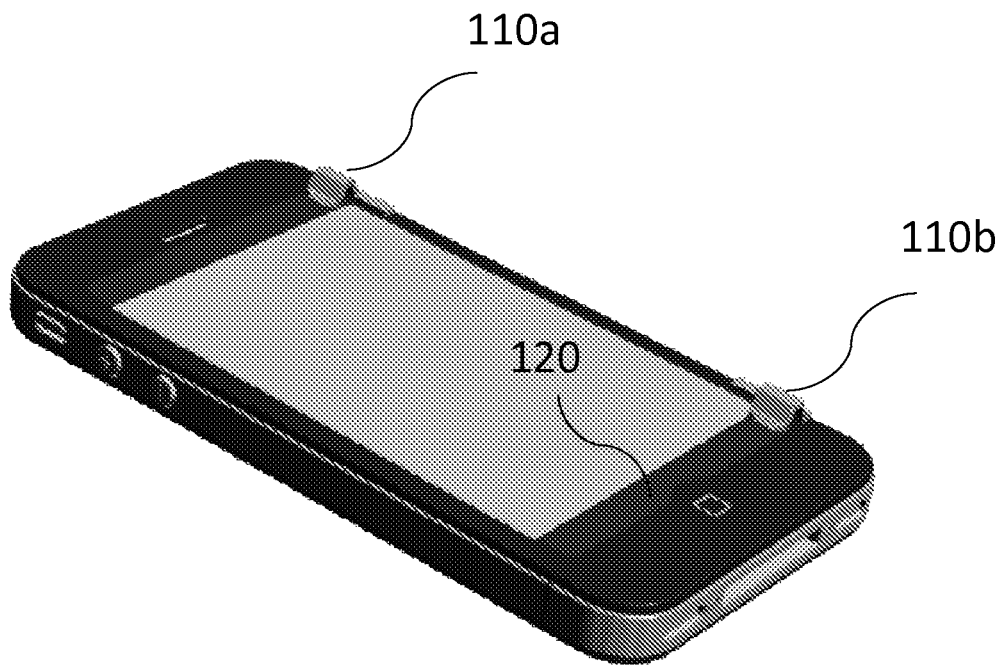
FIG. 1 is a perspective view of a magnification system in accordance with one embodiment of the present invention.
Figure 2:
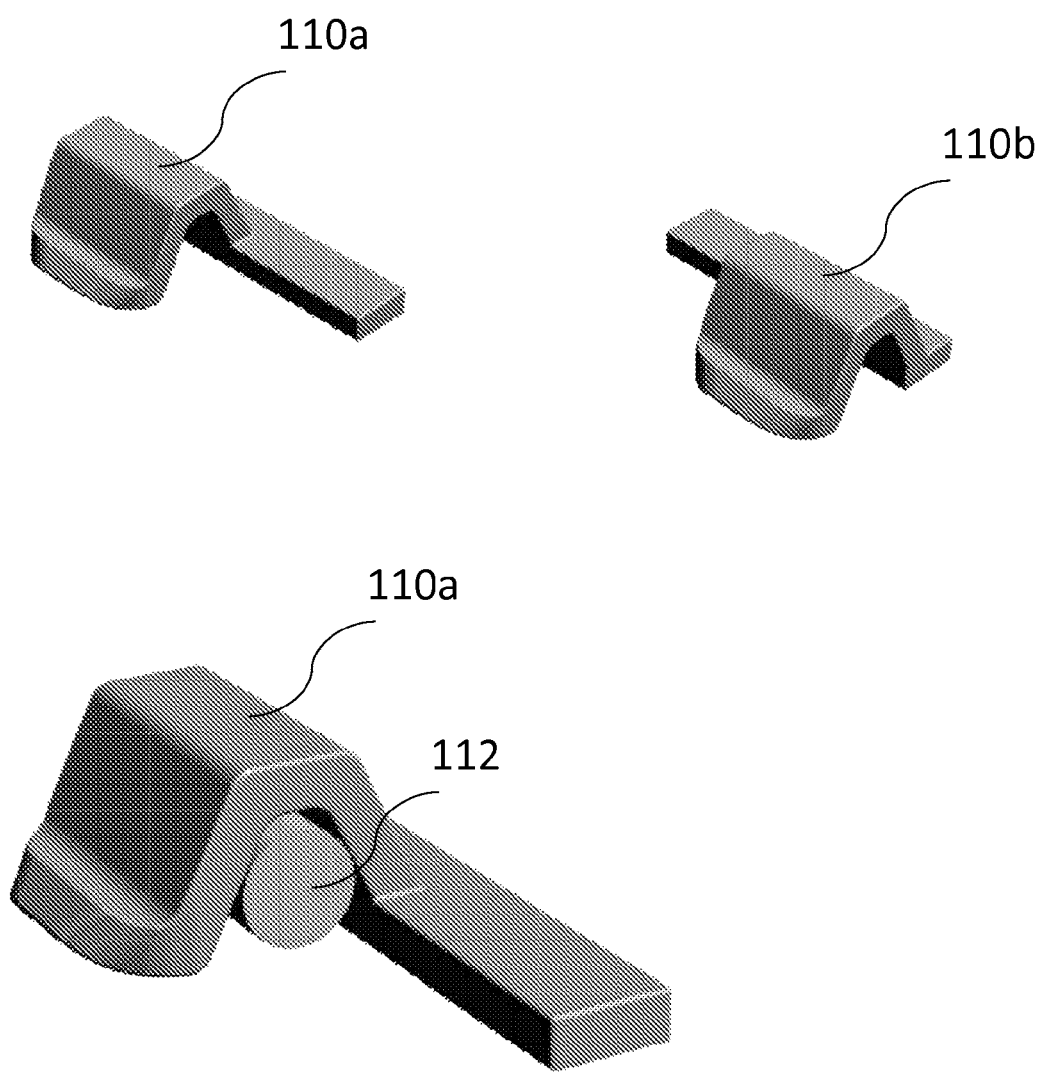
FIG. 2 is a perspective view of individual parts, such as clamps, of the system shown in FIG. 1.

FIG. 1 illustrates magnification system 100 for magnifying surface of a device in accordance with one of the embodiments of the present invention. The device can be a book or any other object, the surface of which needs to be magnified. It can be an electronic device such as a laptop, smartphone, flip phone, tablet, computer, electronic reader, or any other mobile electronic device, or a case for the electronic device such as a case for a smart phone, for example. The system features magnifying lens 120 and securing means such as clips 110a and 110b for securing the lens on the surface of a device such as a smart phone, for example. There can be one clip attached to a device, or more than one clip (e.g., two clips as shown in FIG. 1, or three clips, or more than three clips). The clips are adapted to detachably hold the lens on the surface of the device (when the lens is inserted under the clips) such that, when needed, the lens can be manually taken out, i.e., can be fully detached and used by the user for magnification purposes by holding the lens at a desired distance from the surface being magnified; and then when not needed, the lens can be inserted back under the clips, to a completely stowed position. In some embodiments of the present invention, insert 112 is placed under each clip, as shown in FIG. 2, to prevent the lens from slipping out. In this case, the lens is inserted under the insert. In some embodiments the insert can be placed under only one clip, and the other clips can have no inserts placed thereunder.

The insert can be made of rubber, plastic, or any other suitable material that will provide sufficient friction to prevent the lens from slipping out of the clip. The clips can be permanently or detachably mounted to a surface of the device or to a case for the device using any suitable attaching means, such as Velcro, double sided adhesives, various types of permanent adhesives, glue, or any other attaching means such as screws, nails, and the like. The clips can be attached permanently using glues, adhesives, or the like, or can be attached using adhesives that are semi-permanent but can be removed if desired. The clips are designed to mount to the surface of the device with minimal or no obstruction of the viewable area of the surface being magnified.

The clips can be mounted to a front or backside of the device, or can be mounted to a side portion of the device. According to the present invention, the clips can be mounted on different sides of the device. For example, two clips can be mounted on the front side of the device and the other two clips can be mounted on the backside of the device. The clips can be mounted on one side of the device at the same edge of that side as shown in FIG. 1, or they can be mounted at different edges, e.g., opposite to each other, or diagonally, etc. The clips can be made of plastic, rubber, metal, metal alloy, stainless steel, or any other suitable materials, or their combinations.

Figures 3A, 3B:
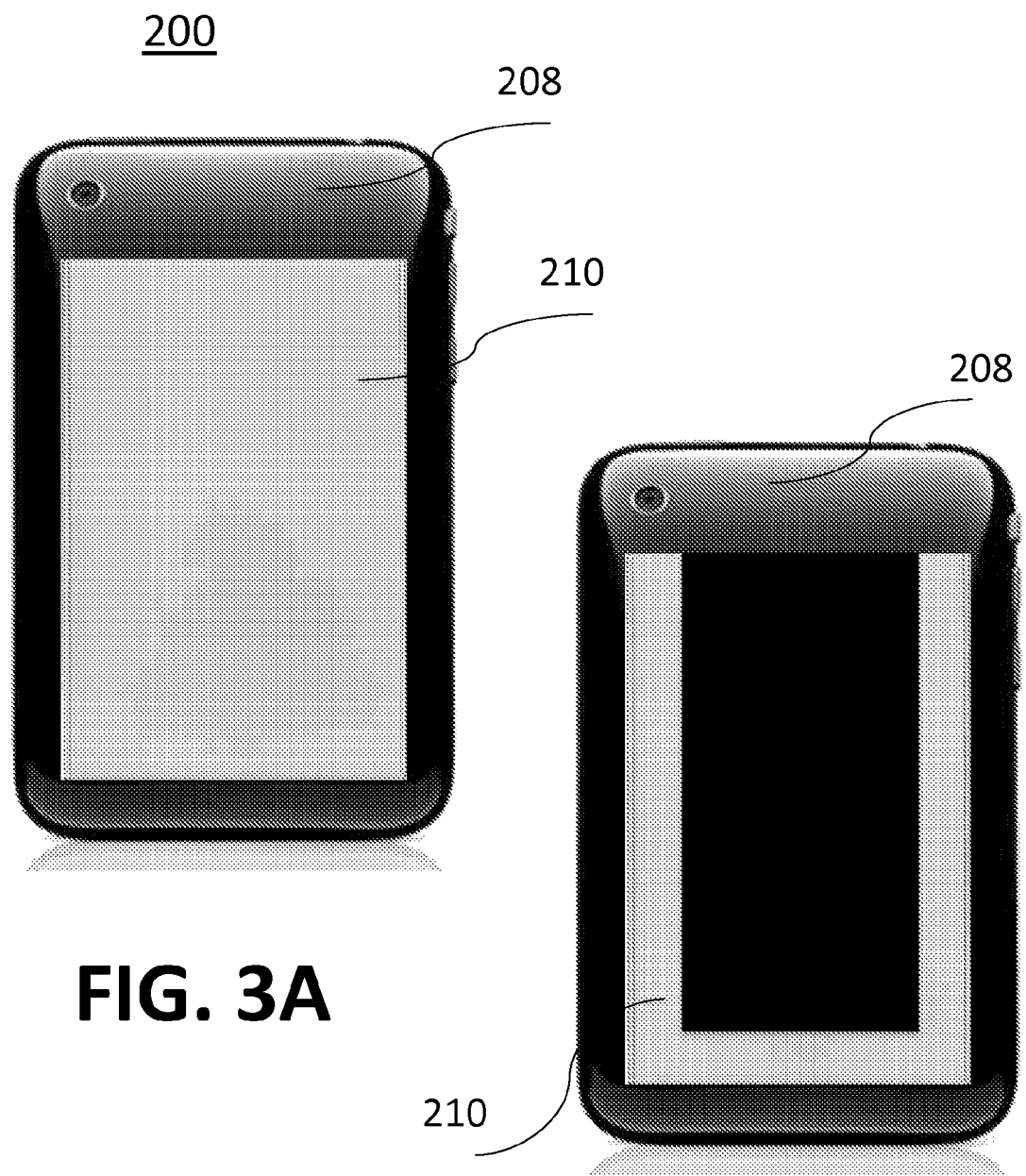
FIGS. 3A and 3B illustrate a magnification system in accordance with another embodiment of the present invention.

According to another embodiment of the present invention, as illustrated in FIG. 3A, magnification system 200 features securing means 210, which is a sleeve for receiving and holding the magnifying lens or a plurality of lenses. The sleeve or a pocket is attached to a device, such as cell phone 208, and is adapted to removably hold the lens (when the lens is inserted into the sleeve or pocket) such that, when needed, the lens can be manually taken out and used by the user for magnification purposes by holding the lens at a desired distance from the surface being magnified; and then when not needed, the lens can be inserted back into the sleeve or pocket to a completely stowed position. The sleeve can be permanently or detachably attached to any side of the device or to a case for the device using any suitable attaching means such as glue, adhesive, Velcro, double-sided adhesive, or any other suitable attaching means. According to this embodiment of the present invention, the sleeve or pocket can be of any suitable shape and size as long as it is adapted to receive and hold the lens or lenses. For example, the sleeve 210 can have a cutout in the middle portion as shown in FIG. 3B. The sleeve can be made of rubber, plastic, paper, or any other suitable materials, or combination of such materials.

According to the present invention, the magnifying lens can be any suitable lens, made of glass, plastic, or any other suitable material. Preferably, the lens is a commercially available Fresnel lens made of plastic material such as PVC or PMMA, or any other suitable material. The lens can be of rectangular, square, or any other suitable shape.

Figure 4:
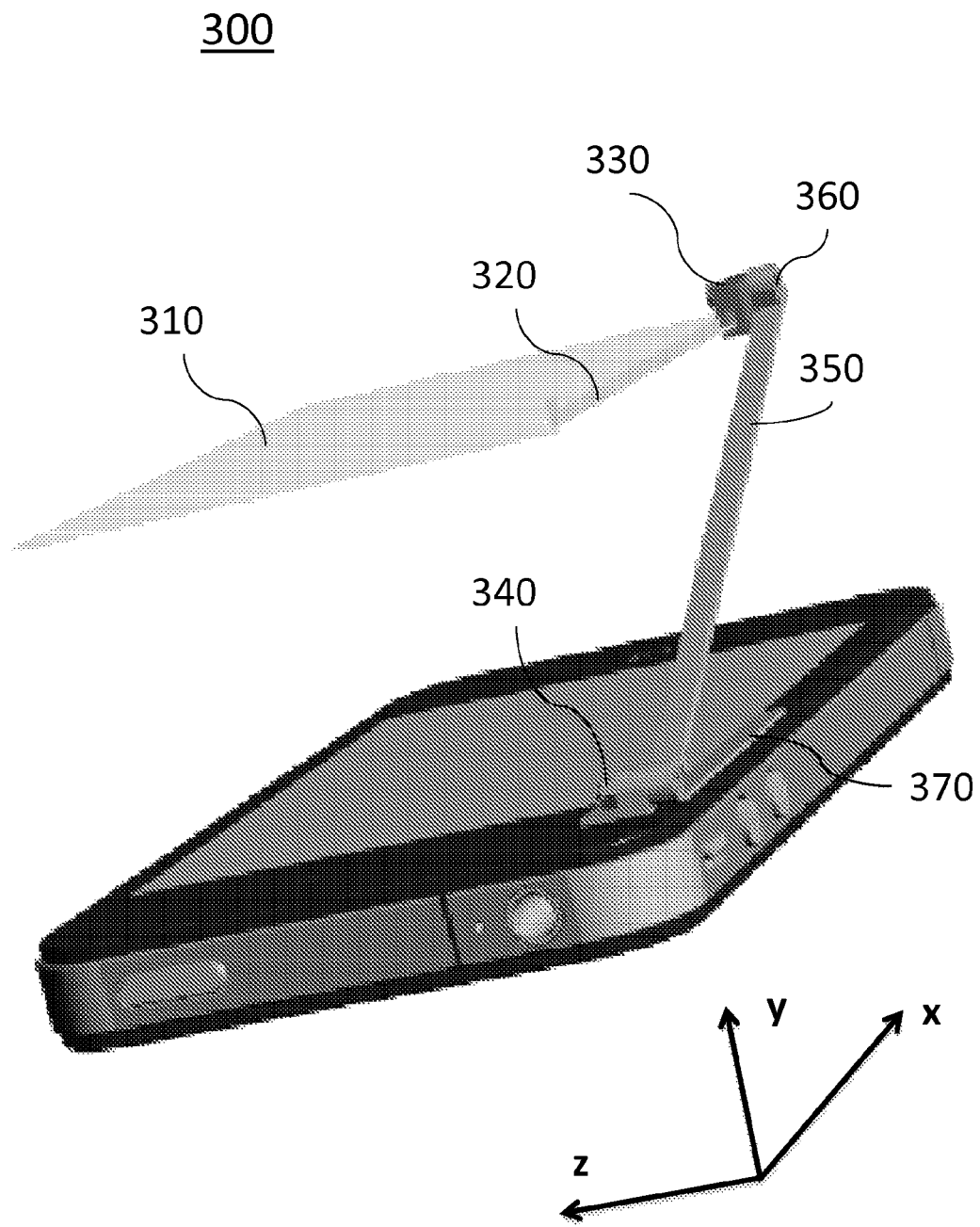
FIG. 4 is a perspective view of a magnification system in accordance with one preferred embodiment of the present invention.
Figure 5A:
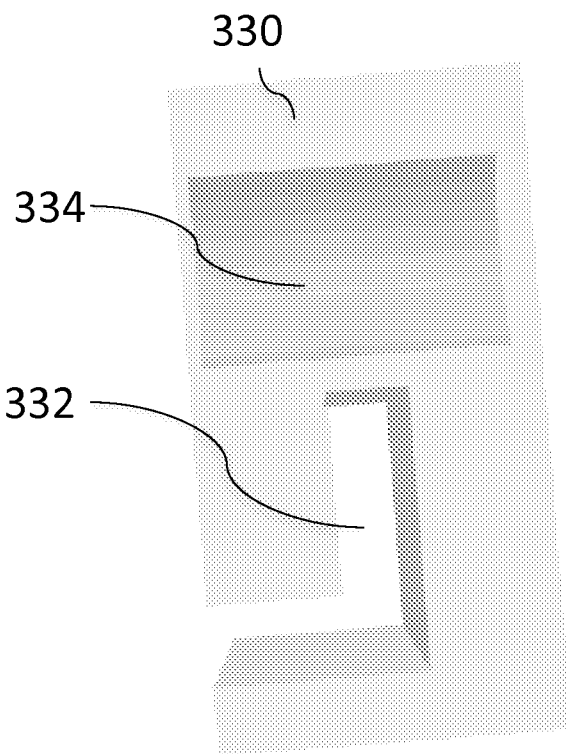
FIG. 5A illustrates an individual part, such as a clip, of the system shown in FIG. 4.
Figure 5B:
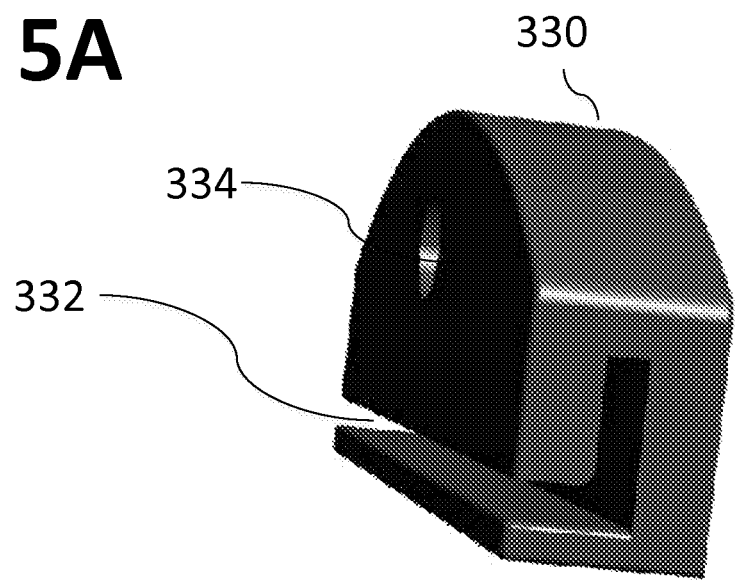
FIG. 5B is a perspective view of another variant of the clip of the system shown in FIG. 4.
Figure 9A:
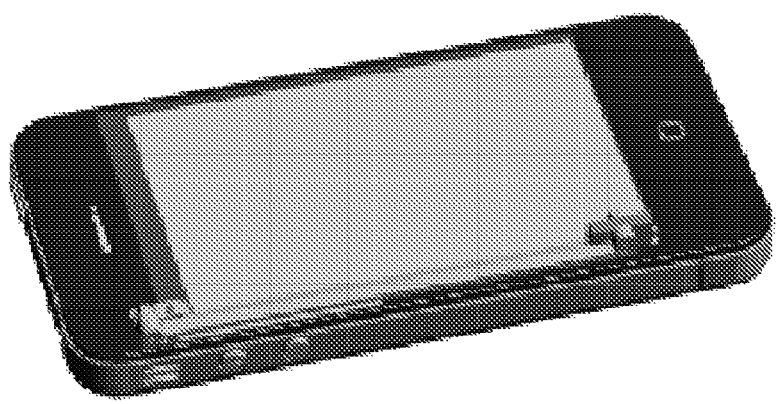
FIG. 9A is a perspective view of the system shown in FIG. 4, illustrating a lens being in a completely stowed position.
Figure 9B:
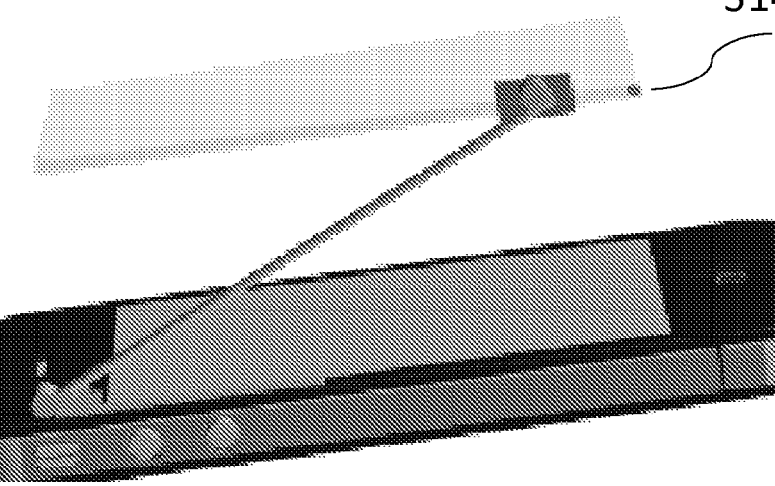
FIG. 9B is a perspective view of the system shown in FIG. 4, illustrating a system with a lens suspended over a surface of a device at some intermediate distance.
Figure 9C:
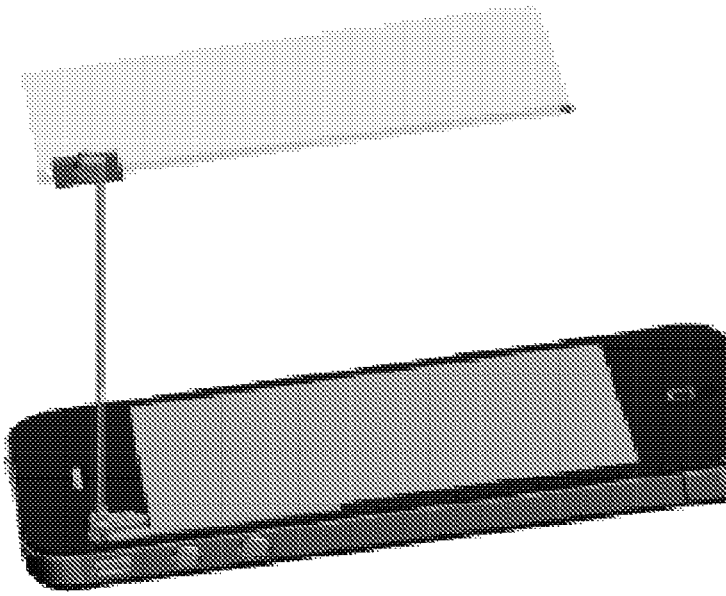
FIG. 9C is a perspective view of the system shown in FIG. 4, illustrating a system with a lens being in the up position.

FIG. 4 illustrates magnification system 300 in accordance with another preferred embodiment of the present invention. Magnifying lens 310 has ridge portion 320 extending along one of the edges of magnifying lens 310. The securing means for securing lens 310 on or above the surface of a device such as a smart phone, for example, comprises base 370 (shown in FIG. 7) adapted to mount to a surface of the device, arm 350 that is pivotally connected to base 370 with first connector 340, clamp 330 that comprises channel 332 (as shown in FIGS. 5A and 5B) for receiving and slidably holding ridge portion 320 of magnifying lens 310, and second connector 360 for pivotally connecting arm 350 to clamp 330. First connector 340 enables arm 350 to pivotally rotate about the first connector thereby allowing adjusting the position of lens above the surface of the device (i.e., to adjust vertical position of the lens, along the y-axis as shown in FIG. 4). The lens can be placed into a completely stowed position as shown in FIG. 9A, or in the up position when the arm is perpendicular to the surface being magnified as shown in FIG. 9C, or in any other position in between. In some embodiments of the present invention, the arm can pivotally rotate about the first connector 180 degrees.

The ridge portion 320 is inserted into channel 332 such that it can slide in a direction parallel to the surface being magnified (i.e., along the x-axis as shown in FIG. 4). According to the present invention, the shape of the channel 332 as shown in FIGS. 5A and 5B has to be in conformance with the shape of the ridge 320 so that the ridge can fit into the channel and slide along the x-axis. For example the rectangular cross-section of L-shaped channel 332 (shown in FIGS. 5A and 5B) is in conformance with the rectangular cross-section of ridge 320 (shown in FIG. 4). In some embodiment, the ridge can also have a triangle or half-oval cross-section, or any other suitable cross-section as long as the cross-section of the channel is in conformance with the cross-section of the ridge (i.e., if the ridge has a triangle cross-section, then the channel has a triangle cross-section).

In some embodiments of the present invention clamp 330 (as shown in FIG. 5B) is configured to prevent the lens from sliding freely along an axis parallel to a surface being magnified (i.e., the x-axis as shown in FIG. 4), but configured to enable the lens to slide in the channel along the x-axis only when some force is applied. This can be achieved by making the clamp out of rubber, for example, or by having a non-smooth surface inside channel 332 to pinch ridge 320 with enough tension to hold it in place but still allow the lens to slide horizontally when some force is applied, such that the ridge is tightly fit into the channel so there is sufficient friction to prevent the lens from freely sliding inside the channel without application of some force.

As shown in FIG. 4, the clamp 330 is pivotally connected to arm 350 via second connector 360 thereby providing for the adjustment of the angle of the lens over the surface being magnified (the lens can be positioned parallel to the surface being magnified, or perpendicular to that surface, or the lens can be moved into whichever angle over the surface being magnified is desired).

Figure 6:
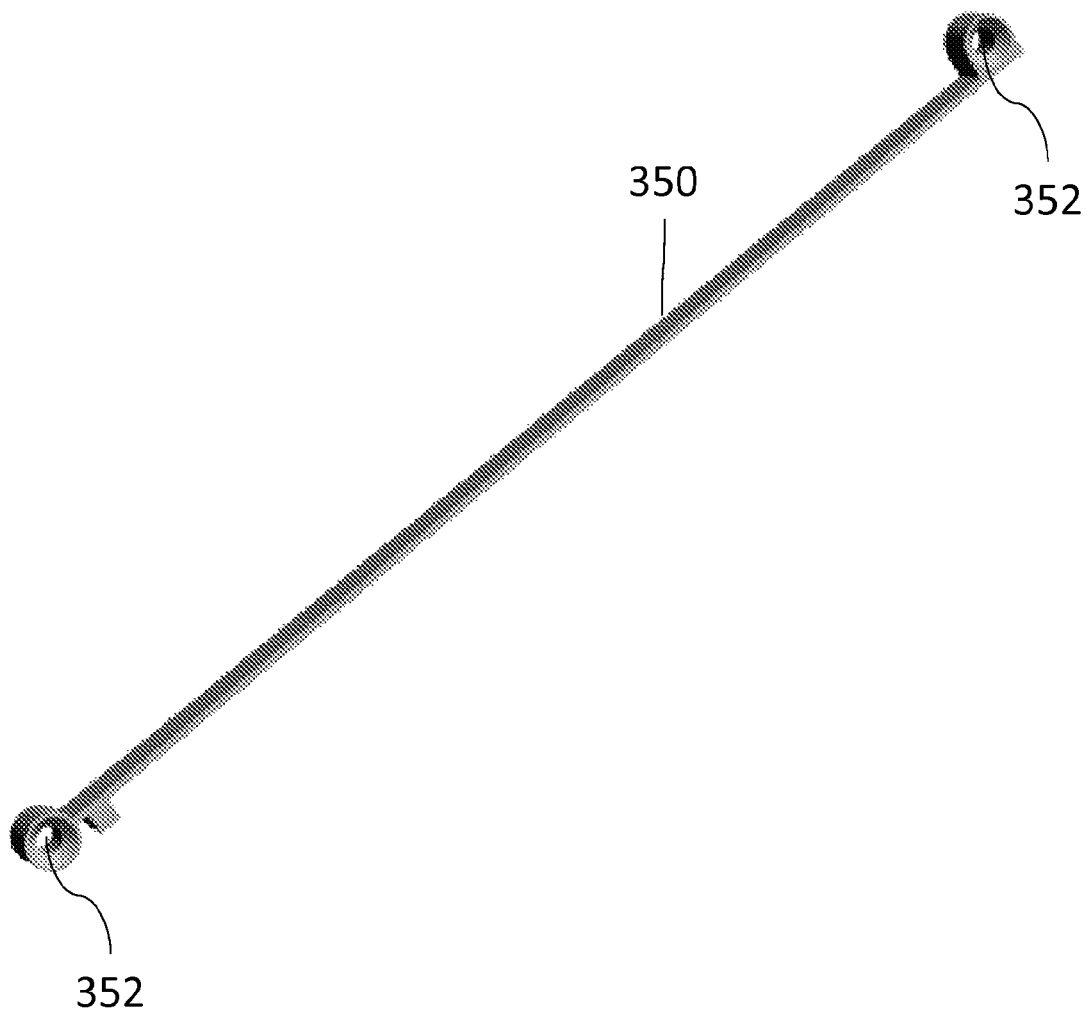
FIG. 6 is a perspective view of an arm of the system shown in FIG. 4.
Figure 7:
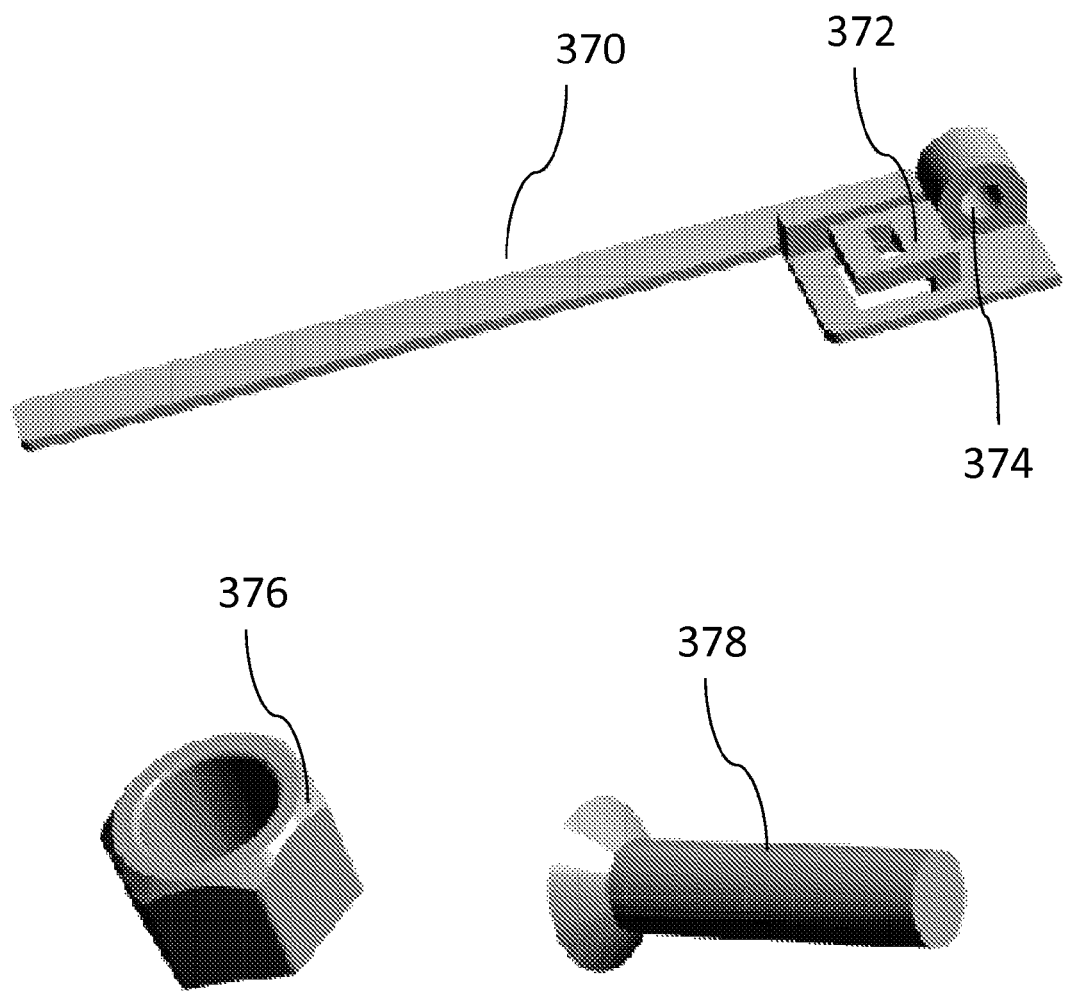
FIG. 7 is a perspective view of a base of the system shown in FIG. 4.

In some embodiments of the present invention, the first and the second connectors can be friction hinge connectors adapted to provide pivotal connection between the arm and the base and between the arm and the clamp, respectively. These connectors can be commercially available friction hinges used in electronic devices such as laptops, for example, which enable the arm to be rotated about the base and the lens to be rotated about the arm when force is applied but which maintain the position of the arm and the lens when no force is applied. The friction hinge connector can comprise micro screw 378 and prevailing torque nut 376 as shown in FIG. 7. According to this embodiment, the arm 350 can comprise openings 352 at its distal ends, as shown in FIG. 6, for attaching the arm to the first and the second connector. Base 370 can have opening 374 (as shown in FIG. 7), and clamp 330 can have opening 334 (as shown in FIG. 5B). Attaching the arm to the base via the first connector is conducted by, for example, inserting the micro screw through the opening 352 of arm 350 (FIG. 6) into the opening 374 in the base 370 (FIG. 7) and attaching the prevailing torque nut from the other end. Similarly, attaching the clamp 330 to the arm can be done by inserting the micro screw through the opening 334 of the clamp 330 and into the opening 352 of arm 350, and attaching the prevailing torque nut from the other end.

In some embodiments of the present invention, the first connector can be a commercially available spring hinge connector, and the second connector can be a friction hinge connector as described above. Alternatively, both connectors can comprise the spring hinge connectors. The spring hinge connector is configured to allow the arm to pop up from the stowed position into the up position.

Figure 8:
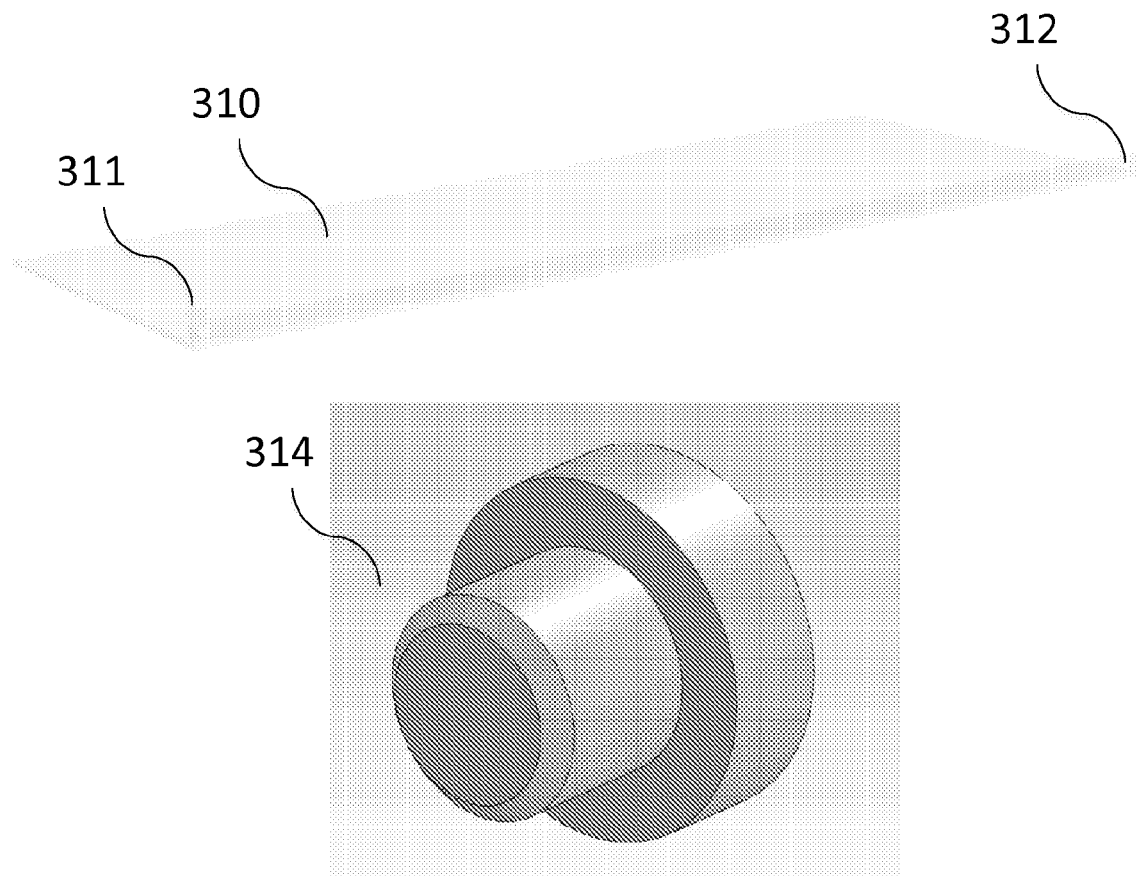
FIG. 8 is a perspective view of a stopper and a lens of the system shown in FIG. 4.

According to some embodiments of the present invention, the ridge portion of the magnifying lens can further comprise stopper 314, as shown in FIG. 8, positioned at each distal end of the ridge portion to prevent the lens form completely sliding off of the channel of the clip when sliding along the axis parallel to the surface being magnified (the x-axis). The stopper 314 can be snap pin 314 (FIG. 8) adapted to insert into opening 312 of the ridge portion, or it can be a screw or a block with adhesive, or any other suitable object adapted to be used as a stopper. The ridge portion can terminate in an L-shaped portion 311 at its each distal end to function as a stopper, or it can be a combination of different types of stoppers (for example, at one distal end of the ridge, there can be L-shaped stopper 311 formed in the lens itself and at the other distal end, there can be snap pin 314 adapted to insert into opening 312 as shown in FIG. 8).

In some embodiments of the present invention, the securing means can further comprise a bracket (not shown) adapted to receive and releasably hold the arm for preventing the arm from moving sideways, i.e., along z-axis shown in FIG. 4 when the arm is in completely stowed position as illustrated in FIG. 9A.

In some embodiments of the present invention, the base 370 can further comprise snap fit member 372 (as shown in FIG. 7) for securing the lens when the arm is completely stowed. The lens slots under the snap fit member so the lens is secured form moving vertically (perpendicular to the surface being magnified) or horizontally when stowed. In order to rotate the arm up from the stowed position, the lens has first to slide forward horizontally (parallel to the surface being magnified).

Figure 10A:
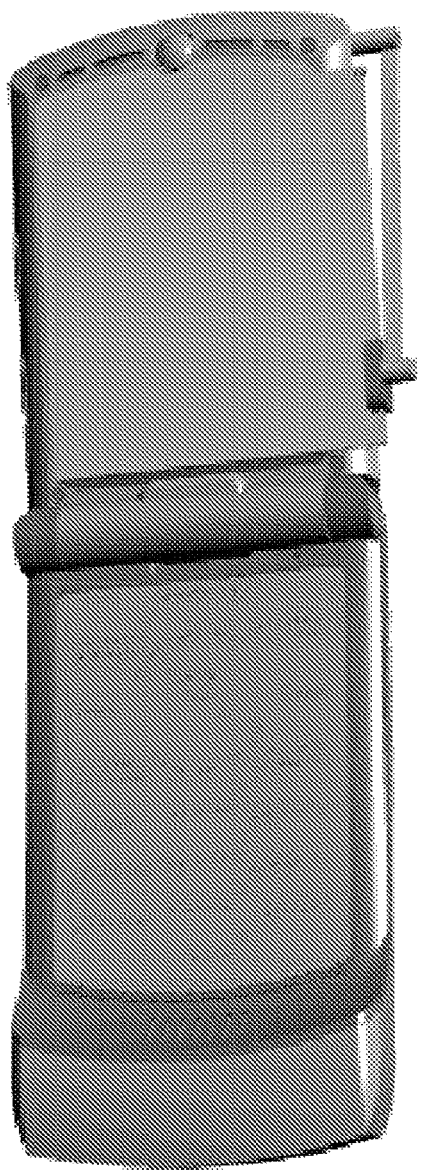
FIG. 10A is an illustration of a system adapted to mount to a flip phone in accordance with one embodiment of the present invention, a view of the front side of the flip phone.
Figure 10B:
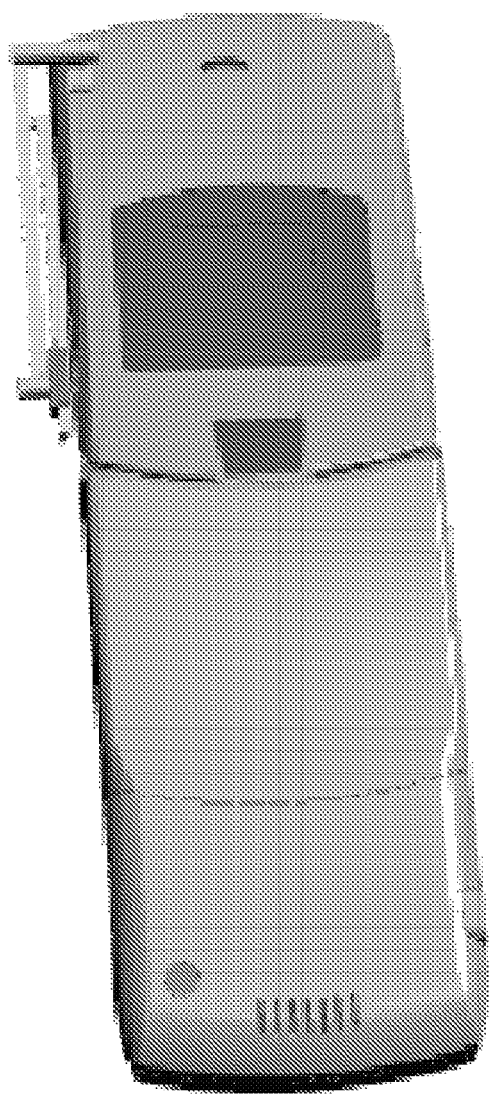
FIG. 10B is an illustration of a system adapted to mount to a flip phone in accordance with one embodiment of the present invention, a view of the backside of the flip phone.

As described above, the magnification system of the present invention can be adapted to mount on the front and backside of the device, as well as on the side of the device. For example, the magnification system shown in FIGS. 10A and 10B is adapted to mount to an electronic device such as a flip phone, where the base of the securing means is mounted on the backside of the flip phone as shown in FIG. 10B.

In some instances, the magnification lens such as Fresnel lens can be made from a thin material having a thickness in the range from 0.2 mm to 5 mm, preferably from 0.5 mm to 3 mm, to allow for touch-screen functionality of an electronic device when stowed. In some embodiments, where the touch-screen functionality is not an issue, the thickness of the lens can be more than 5 mm.

Figure 11:
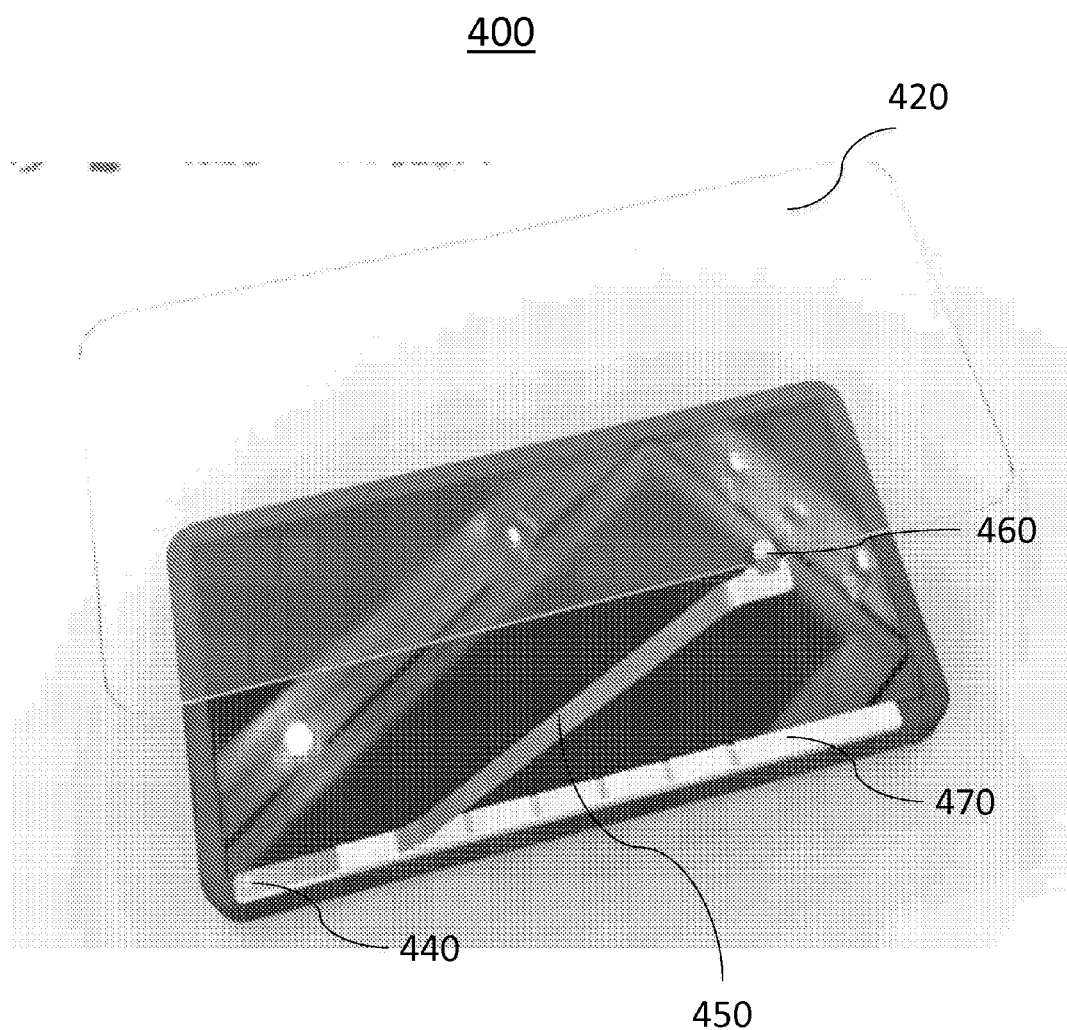
FIG. 11 is a perspective view of a magnification system in accordance with another embodiment of the present invention.

According to another preferred embodiment of the present invention, as illustrated in FIG. 11, the securing means of magnification system 400 comprises base housing 470, arm 450 that is pivotally connected to base housing 470 with first connector 440, enabling the arm to slide into and out of the base housing, and second connector 460 that connects the arm 450 to magnifying lens 420.

The base housing can be permanently or detachably attached to a device using any suitable adhesives such as double sided adhesive, Velcro, glue, or any other commercially available adhesives, or other attaching means such as clamps, screws, nails, and the like. A substantial portion of the housing can have a U-shaped profile (or it can have a V-shaped profile, or it can have any other suitable shapes) as long as the respective shape of the arm and the base housing are in conformance and provide for the arm to slide in and out of the base housing. In some embodiments, some portion of the arm (near the pivot point of the first connector) is flat as shown in FIG. 12.

Figure 12:
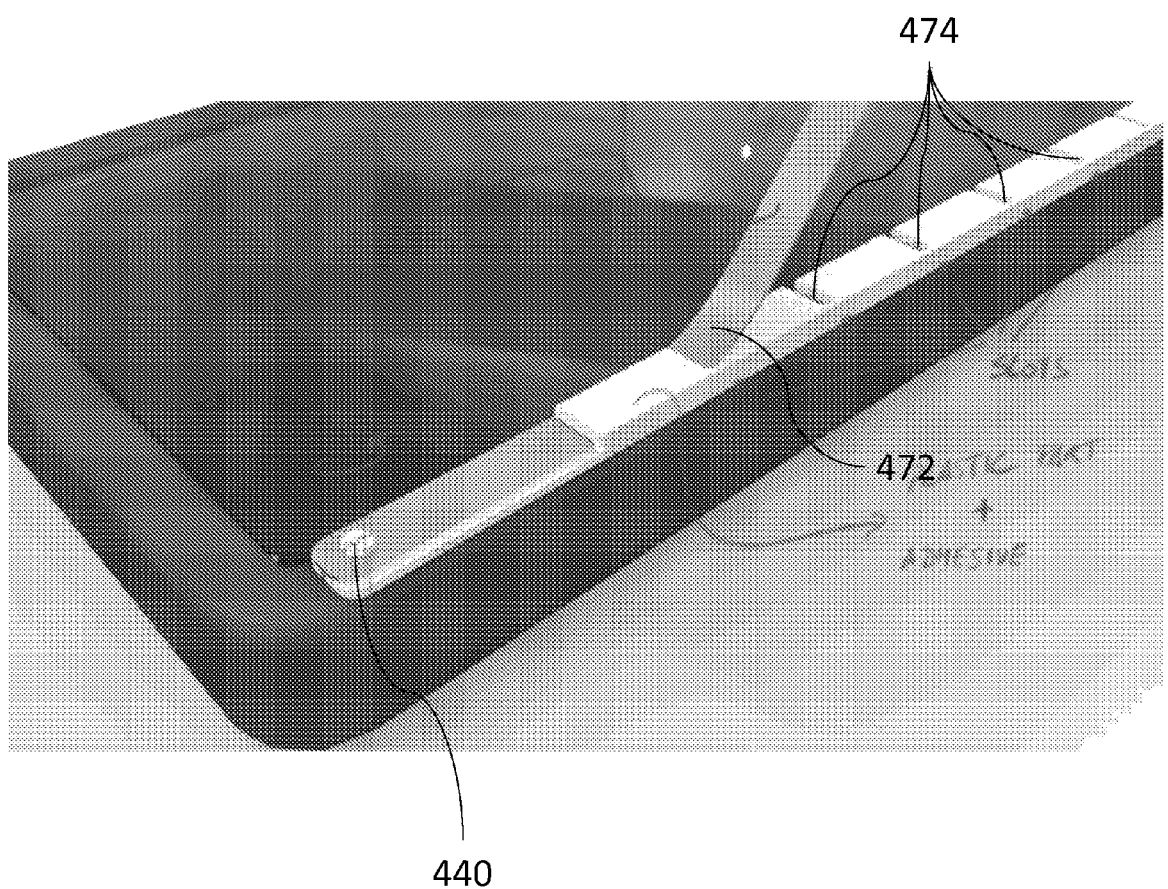
FIG. 12 is a magnified partial perspective view of the system shown in FIG. 11.

As shown in FIG. 12, the arm is pivotally connected to the base with the first connector such as pin 440, which enables the arm to slide in and out of the base housing. The arm can be made of metal, stainless steel, plastic, or any other suitable materials. The arm can have bend portion 472 such that the natural resting state of the arm is the up position. In this instance, the arm should be made of spring steel or a similar elastic material. The base housing can have at least one slot 474 in its top portion adapted to receive the bend portion of the arm. The height of the lens above the surface being magnified can be adjusted by inserting the arm into different slots of the housing. The arm can be stowed by first rotating the arm away from the slot in the base housing, then flattening the bend so the arm is parallel to the surface being magnified and then rotating it back into the U-shaped base housing. Because the arm has the bend portion, when pressed down so its entire length is inside the base, the arm will press up, which will hold it snugly inside the base housing, keeping it form rotating outward due to gravity when the device is rotated.

The second connector 460 (FIG. 11) is configured to allow the lens 420 to slide along the direction parallel to the surface being magnified (i.e., the x-axis as illustrated in FIG. 4).

Figure 13:
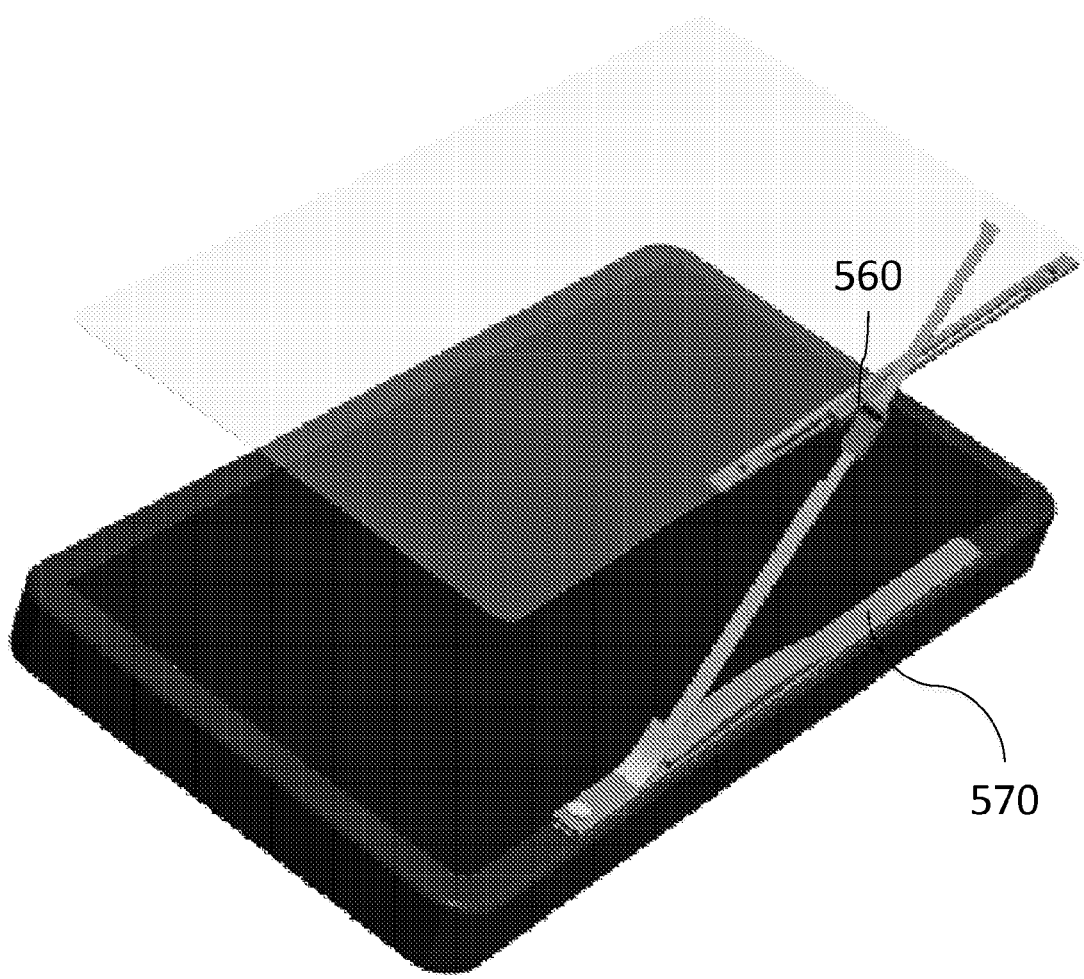
FIG. 13 is a perspective view of a magnification system in accordance with another preferred embodiment of the present invention.
Figure 14:
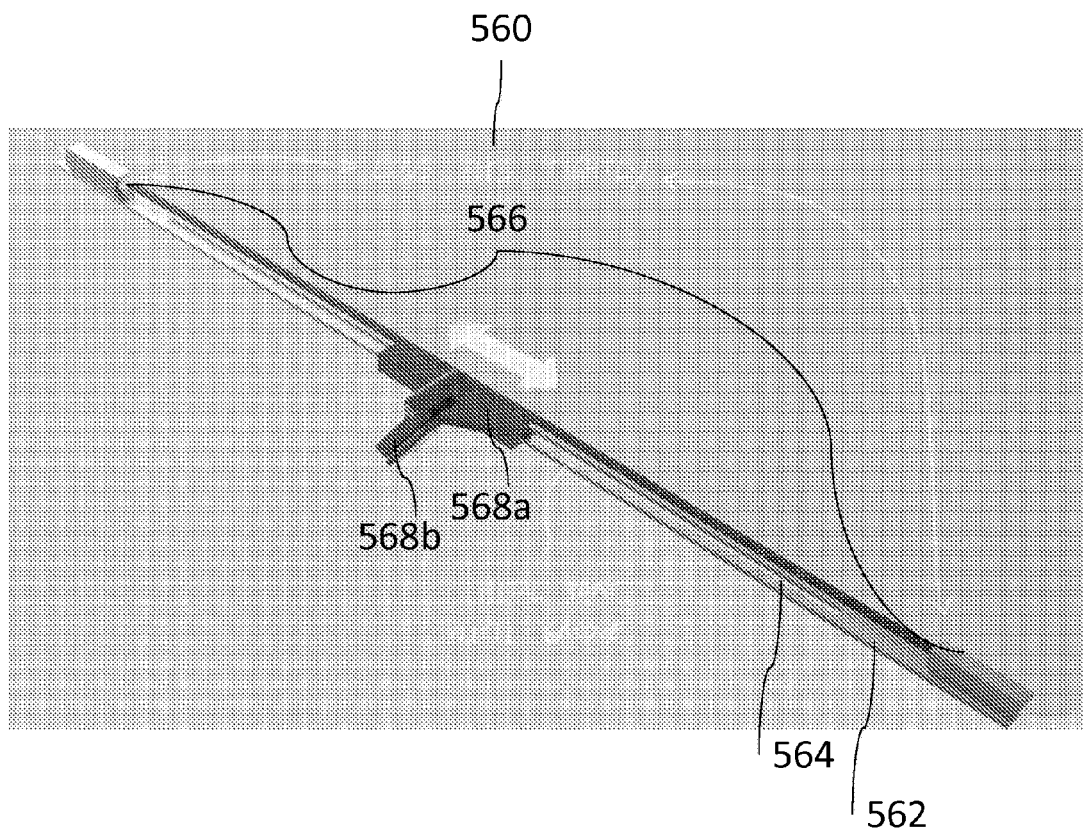
FIG. 14 illustrates the parts that form a second connector in accordance with the embodiment of the system shown in FIG. 13.
Figure 16:
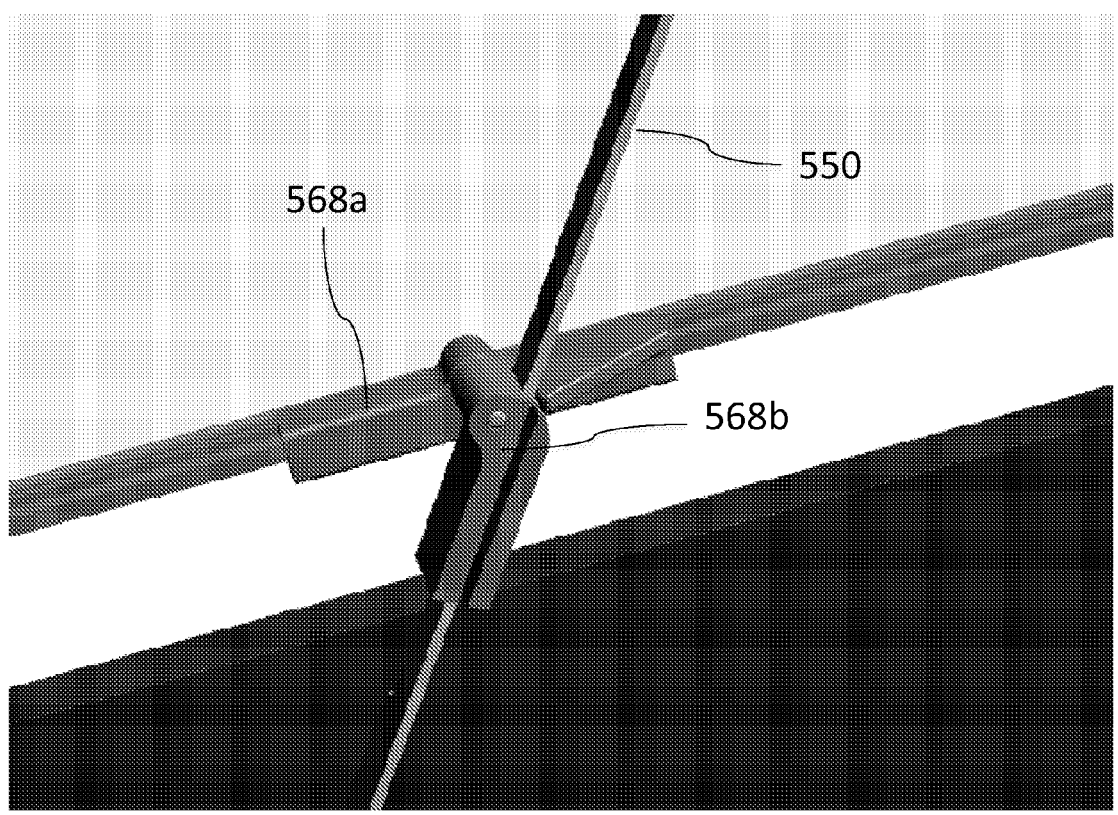
FIG. 16 is a perspective view illustrating a second pivotally connected part sliding along the length of the arm in accordance with the embodiment shown in FIG. 13.
Figure 17A:
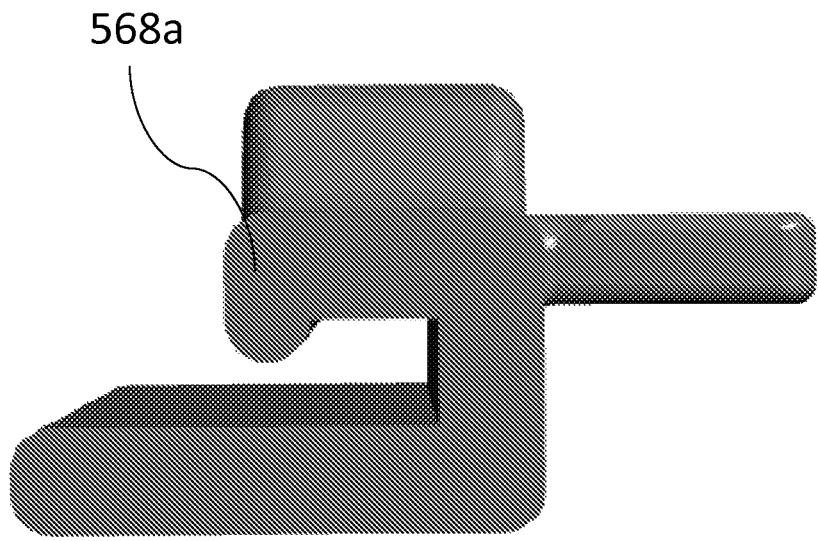
FIG. 17 is a perspective view of a first pivotally connected part shown in FIG. 16.
Figure 17B:
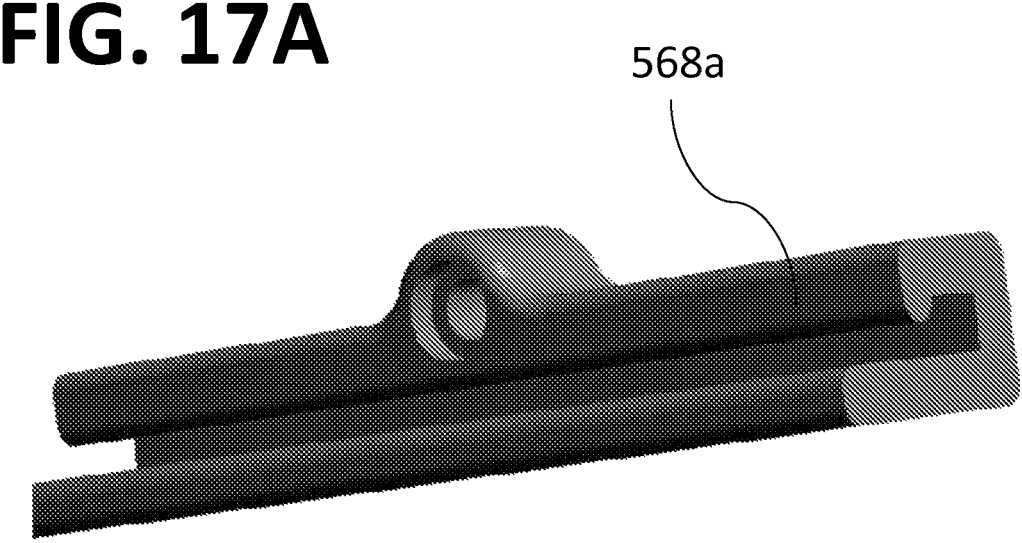
Figure 18A:
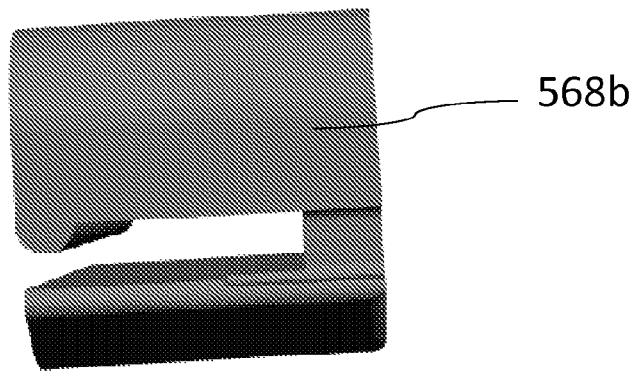
Figure 18B:
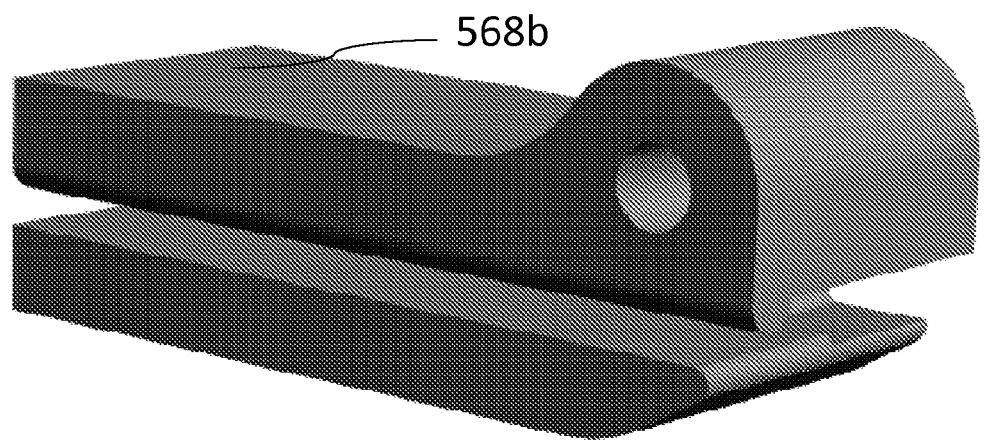

According to some embodiments of the present invention, a second connector (e.g., connector 560 of FIGS. 13 and 14) can comprise slider member 562 having attaching means 566 at its distal ends and groove 564 in its central portion, and a first and a second pivotally connected parts (568a and 568b, respectively). The lens is attached to slider member 562 with attaching means 566, which can be clips, clamps, recesses in the slider member, or any other suitable attaching means. The slider member in turn is attached to the first pivotally connected part 568a thereby allowing the first pivotally connected part to move alone the groove 564, which is along the x-axis as illustrated in FIG. 4. The second pivotally connected part 568b is adapted to slide along the length of the arm 550 (FIG. 16) thereby providing for adjusting a vertical position of the lens in relation to the surface being magnified (i.e., to adjust the height of the lens above the surface being magnified, along the y-axis as illustrated in FIG. 4). An example of the front and side view of the first pivotally connected part 568a is shown in FIGS. 17A and 17B, respectively. An example of the front and side view of the second pivotally connected part is shown in FIGS. 18A and 18B, respectively. The first pivotally connected part 568a has a channel adapted to receive the slider member such that when the slider member is inserted into the channel of the first pivotally connected part, the first pivotally connected part can move along the groove in the slider member. In some embodiments, instead of the groove, the ridge or any other protrusion can be utilized for being inserted into the channel of the first pivotally connected part. The second pivotally connected part has a channel for receiving the arm such that when the arm is inserted into the channel of the second pivotally connected part, this part can move along the length of the arm as explained above. The angle of the lens in relation to the surface being magnified can be adjusted by rotating the first pivotally connected part relative to the second pivotally connected part. In some embodiments the first and second pivotally connected parts can have the pivot that is designed to stop at the point where the lens is parallel to the surface being magnified.

Figure 15:
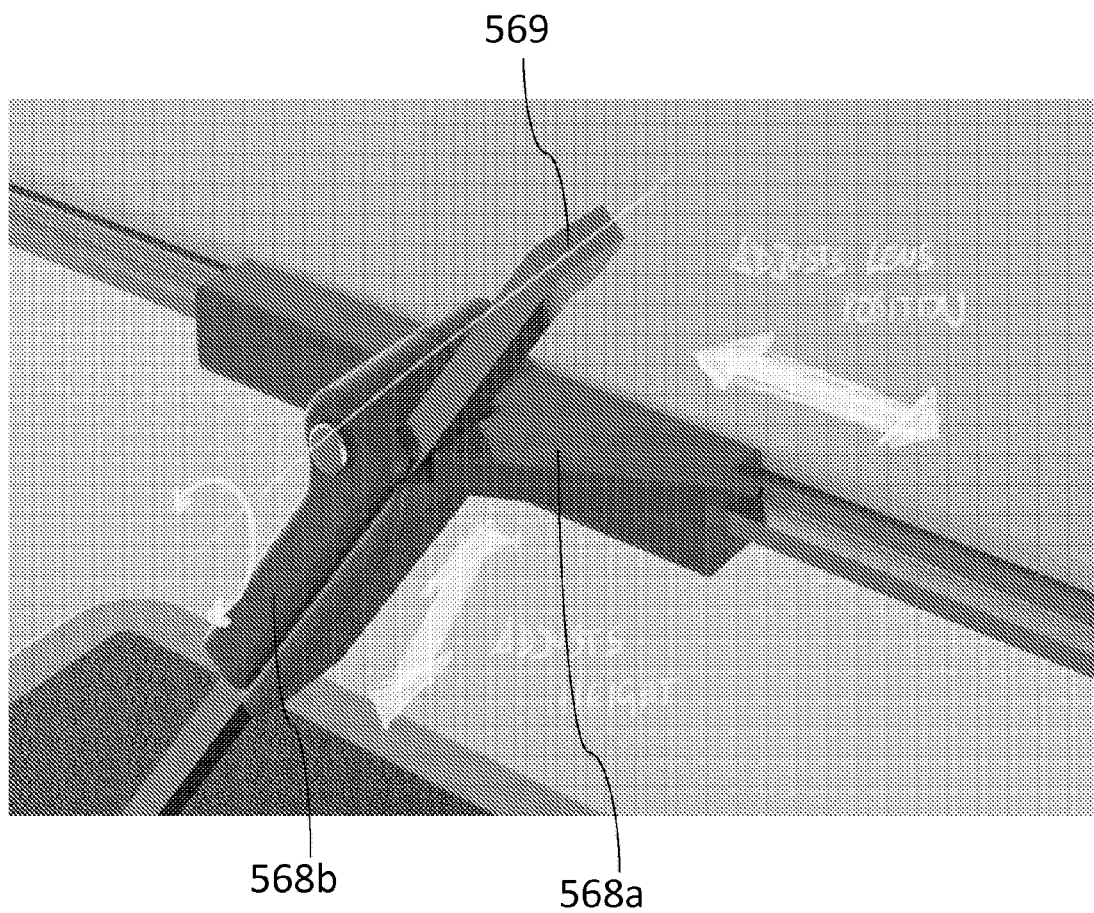
FIG. 15 is a magnified view of the second connector shown in FIG. 14, illustrating a first and a second pivotally connected parts.

In some embodiments, there can be a stopper element, such as L-shaped portion 569 located at the distal end of the arm as shown in FIG. 15, to prevent the second pivotally connected part 568b from sliding out completely when moving along the length of the arm. The stopper element can be any other suitable element positioned at the end of the arm, such as a pin, a screw, or a plastic cap, for example.

Figure 19A:
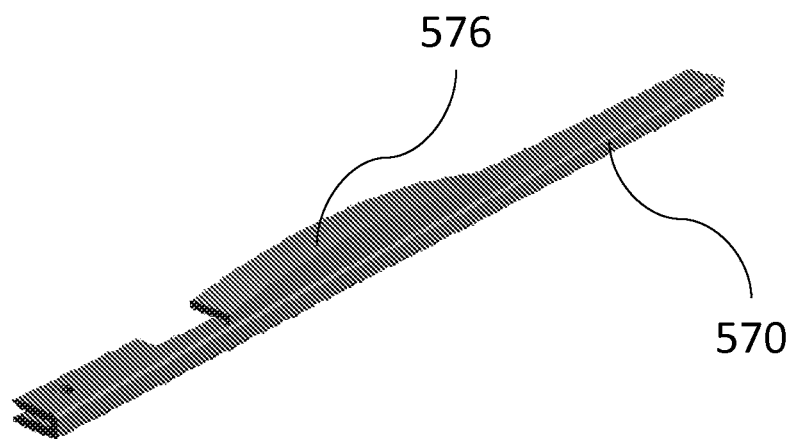
FIG. 19A is a perspective view of a backside of the base housing of the system shown in FIG. 13.
Figure 19B:
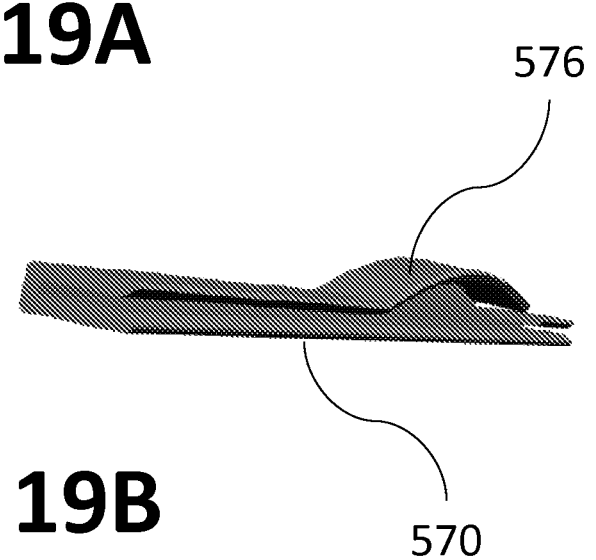
FIG. 19B is a perspective view of a front side of the base housing of the system shown in FIG. 13.

In some embodiments, the top portion of the base housing can be further configured to provide for the curvature of the arm when the arm is completely stowed in the base housing. For example, as illustrated in FIGS. 19A and 19B, the top portion of the base housing has curved portion 576 for receiving the bend portion of the arm when the arm is stowed in the base housing. In some embodiments, for the same purpose, the top portion of the base housing can have an opening instead of the curved portion.

It will be understood that the securing means of the magnification system in accordance with the described-above embodiments can be made of any suitable materials such as metal, stainless steel, plastic, rubber, or any other suitable materials, or combination thereof.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A magnification system for magnifying a surface of a device, the system comprising a magnifying lens comprising a ridge portion extending along one of the edges: and securing means for securing said magnifying lens on or above the surface of the device, wherein said securing means comprising a base adapted to mount to a surface of the device, an arm pivotally connected to said base with a first connector, a clamp comprising a channel therein for receiving and slidably holding said ridge portion of said magnifying lens, and a second connector for pivotally connecting said arm to said clamp, wherein said second connector comprising a slider member having a groove and means for attaching said lens to said slider member, and a first and a second pivotally connected part; wherein said slider member is being attached to said first pivotally connected part thereby allowing said first pivotally connected part to move along said groove of said slider element; and wherein said second pivotally connected part is adapted to slide along a length of said arm thereby allowing for adjustments to a vertical position of said magnifying lens in relation to the surface being magnified.

2. The system of claim 1, wherein a top portion of said base housing is configured to provide for the curvature of the arm when the arm is completely stowed in said base housing.

3. The system of claim 2, wherein said top portion of said base housing further comprising a curved portion configured to provide for the curvature of the arm when the arm is completely stowed in said base housing.

4. The system of claim 2, wherein said top portion of said housing further comprising an opening to provide for the curvature of the arm when the arm is completely stowed in said base housing.

* * * * *